United States Patent [19]

Kosich

[11] Patent Number: 5,121,033
[45] Date of Patent: Jun. 9, 1992

[54] STROBE CIRCUIT UTILIZING OPTOCOUPLER IN DC-TO-DC CONVERTER

[75] Inventor: Joseph Kosich, South Toms River, N.J.

[73] Assignee: Wheelock Inc., Long Branch, N.J.

[21] Appl. No.: 635,304

[22] Filed: Dec. 28, 1990

[51] Int. Cl.[5] .............................................. H05B 37/00
[52] U.S. Cl. ............................ 315/241 R; 315/241 S; 340/331
[58] Field of Search ................ 315/241 RW, 241 SW, 315/241 P, 200 A, 125, 276, DIG. 7; 340/331, 326, 332, 384 R, 815.01, 815.11

[56] References Cited

U.S. PATENT DOCUMENTS

| | | | |
|---|---|---|---|
| 3,921,034 | 11/1975 | Nakamura | 315/241 P |
| 4,065,700 | 12/1977 | Liebman | 315/241 P |
| 4,101,880 | 7/1978 | Haus | 340/326 |
| 4,495,447 | 1/1985 | Shigemi | 315/241 P |
| 4,572,991 | 2/1986 | Coté | 315/241 R |
| 4,742,328 | 5/1988 | Arai et al. | 340/326 |
| 4,775,821 | 10/1988 | Sikora | 315/241 S |
| 4,779,027 | 10/1988 | Sikora | 315/241 S |
| 4,952,906 | 8/1990 | Buyak et al. | 340/331 |
| 4,967,177 | 10/1990 | Nguyen | 340/326 |

Primary Examiner—Eugene R. LaRoche
Assistant Examiner—Amir Zarabian
Attorney, Agent, or Firm—Brumbaugh, Graves, Donohue & Raymond

[57] ABSTRACT

A strobe alarm circuit utilizing an optocoupler in the DC-to-DC converter portion of the circuit for repetitively connecting and disconnecting an energy-storing inductor across a DC power source. The light-emitting diode portion of the optocoupler is connected in parallel with a resistor connected in series with the inductor for continuously monitoring the current flowing through the inductor; when the inductor current has attained a particular value at which the voltage drop across the resistor is sufficient to turn on the LED, the switch portion of the optocoupler is turned on and disconnects the inductor from across the source. After a short interval determined by the parameters of the optocoupler and associated circuitry, the cycle is repeated.

5 Claims, 1 Drawing Sheet

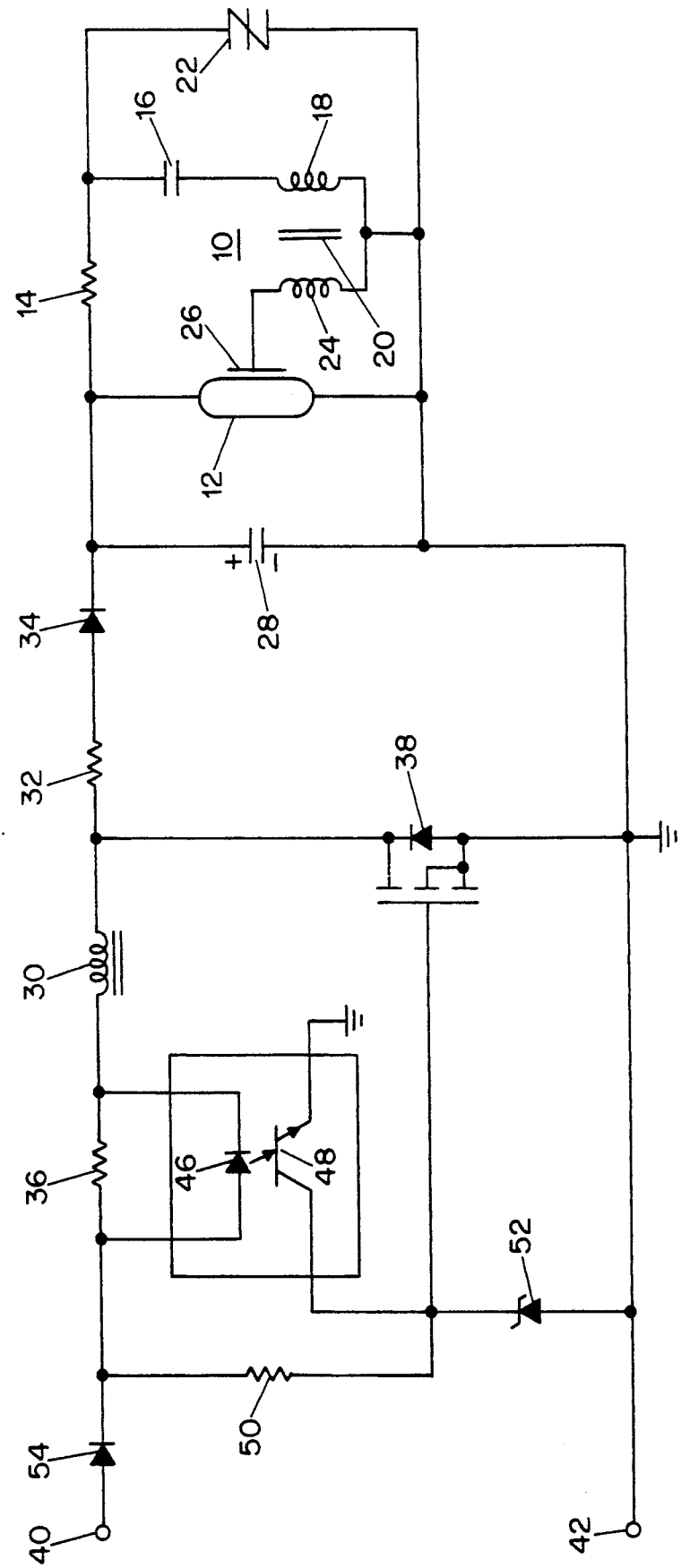

STROBE CIRCUIT UTILIZING OPTOCOUPLER IN DC-TO-DC CONVERTER

BACKGROUND OF THE INVENTION

This invention relates circuits for electronic strobe lights such are used to provide visual warning in electronic fire alarm devices and other emergency warning devices. Such devices are frequently associated with audible warning devices such as horns, and provide an additional means for getting the attention of persons who may be in danger. The strobe light commonly utilized in such systems is a gaseous discharge tube the firing of which is initiated by a trigger circuit which forms part of the flash unit. Energy for the flash is typically supplied from a capacitor connected in shunt with the flash unit and occurs when the voltage across the flash unit exceeds the threshold firing voltage required to actuate the trigger circuit. After the flashtube is triggered, it becomes conductive and rapidly discharges the stored energy from the shunt capacitor until the voltage across the flashtube has decreased to a value at which the flashtube extinguishes and becomes nonconductive.

Typically, such strobe alarm circuits are energized from a DC power source and include a DC-to-DC converter, an inductor coupled to the capacitor connected in parallel with the flash unit, and a switching circuit for connecting and disconnecting the inductor across the DC source to store energy in the inductor during closed periods of the switch and to transfer stored energy from the inductor to the storage capacitor during open periods of the switch. In most applications, it is necessary to miniaturize the circuitry, including the DC-to-DC converter, to the maximum extent possible so that it can be installed inside the lens of the strobe light. Also, the cost of the circuit desirably is kept as low as possible and at the same time its efficiency and reliability must be as high as possible, even when exposed to extreme environmental conditions.

SUMMARY OF THE INVENTION

It is primary object of the present invention to provide an improved DC-to-DC converter for a strobe alarm circuit which limits the peak current flowing through the inductor to a predetermined value which remains relatively constant with variations in supply voltage so as to enable precise specification of the parameters of the inductor without danger of saturation.

Still another object of the invention is to provide a strobe alarm circuit having a minimum number of easily assembled, miniaturized, reliable components.

Briefly stated, in the strobe alarm circuit according to the present invention, a DC-to-DC converter circuit receives an input voltage from a DC source and intermittently connects and disconnects an inductor across the source to store energy in the inductor during periods of connection. During periods when the inductor is disconnected from across the DC source, energy stored in the inductor is coupled to a capacitor connected in parallel with a flash unit. The DC-to-DC converter includes a current sensing resistor connected in series with the inductor, an optocoupler consisting of a light-emitting diode and a photosensitive switching device which is rendered conducting in response to illumination from the diode. The diode is connected in parallel with the current-sensing resistor and in response to the current through the inductor attaining a predetermined value causes the switching device of the optocoupler to conduct and to open a switch connected in series with the inductor. The current-sensing resistor continuously monitors the current flowing through the inductor, and in response thereto the optocoupler opens the switch for a short period following each charge cycle of the inductor and then closes it, the switching occurring at a frequency sufficiently high to insure flashing of the flashtube at a desired rate.

BRIEF DESCRIPTION OF THE DRAWING

Other objects, features and advantages of the invention will become apparent and its construction and operation better understood, from the following detailed description, taken in conjunction with the accompanying drawing, the single figure of which is a schematic circuit diagram of a preferred embodiment of the invention.

EMBODIMENT OF THE PREFERRED EMBODIMENT

In the drawing a flash unit 10 is shown as having a flashtube 12 shunted by a trigger circuit which includes a resistor 14 connected in series with the combination of a SIDAC 22 connected in parallel with the series combination of a capacitor 16 and the primary winding 18 of an autotransformer 20. The secondary winding 24 of autotransformer is connected to the trigger band 26 of the flashtube 12 so that when the voltage across the flashtube exceeds its threshold firing voltage, SIDAC 22 will break down and storage capacitor 16 will discharge through the autotransformer 20 thereby and cause the flashtube to become conductive. The flashtube will quickly discharge the energy stored in capacitor 28 so that the capacitor can be recharged by the DC-to-DC converter of the invention, which will now be described.

The capacitor 28 is incrementally charged from an inductor 30 which is connected to the positive terminal of the capacitor through a resistor 32 connected in series with a diode 34. The rate at which increments of energy are transferred from the inductor 30 to the capacitor 28 is determined by a circuit which includes a resistor 36 connected in series with inductor 30 so as to provide a voltage drop indicative of the magnitude of the current flowing through inductor 30 when a switch 38, which may be a MOSFET, is closed and connects the inductor across a DC voltage source, represented by terminals 40 and 42. Opening of switch 38 is controlled by an optocoupler 44, which may be a Motorola Type 4N37 optoisolator with transistor output. This optoisolator consists of a gallium-arsenide infrared emitting diode 46 optically coupled to a monolithic silicon phototransistor detector 48. The voltage at the collector electrode of the transistor portion of the optoisolator and at the base electrode of MOSFET 38 is established by a voltage divider consisting of a resistor 50 and a zener diode 52 connected in series across the DC supply.

Initially, as power is applied to the circuit, the LED 46 and transistor 48 of the optoisolator are both "off" and switch 38 quickly turns "on" and connects inductor 30 across the DC source, initiating charging of inductor 30 and a buildup of current flow through an isolating diode 54 and resistor 36. When the charging current flowing through inductor 30 has attained a value sufficient to develop a voltage drop across resistor 36 of approximately 1.2 volts, the conduction threshold voltage of the LED, the diode is turned on and illuminates transistor 48 to turn it "on" which, in turn, causes switch 38 to be turned "off" and to disconnect inductor 30 from across the DC source. During the open "off" period of switch 38, energy stored in inductor 30 is transferred through resistor 32 and diode 34 to capacitor 28. Upon cessation of current flow through resistor 36 due to opening of switch 38, the voltage drop across resistor 36 is insufficient to keep light-emitting diode 46 on, the transistor 48 stops conducting and switch 38 is again turned "on" and the cycle is repeated.

The connecting and disconnecting periods of switch 38 are determined by the switching characteristics of the optoisolator, the values of resistors 36 and 50 and Zener diode 52, the value of the inductor 30, and the voltage of the DC source, and may be designed to cycle at a frequency in the range from about 3,000 Hz to about 17,500 Hz. The repetitive opening and closing of switch 38 will eventually charge capacitor 28 to the point at which the voltage across it attains the threshold value required to fire the flashtube. As mentioned previously, when that point is reached, SIDAC 22 breaks down and causes a trigger pulse to be applied to trigger band 26 to trigger flashtube 12 into conduction and producing a flash. When the voltage across capacitor 28 drops to approximately fifty volts, the flashtube 12 stops conducting and the recharging cycle is repeated.

By way of example, the illustrated circuit, when energized from a 12 volt DC power source, may use the following parameters for the circuit elements to obtain a flash frequency of sixty flashes per minute:

| Element | Value or No. |
| --- | --- |
| diode 54 | 1N4004 |
| diode 34 | HER106 |
| resistor 50 | 22K |
| resistor 36 | 12.1 ohms |
| resistor 32 | 47 ohms |
| resistor 14 | 220K |
| inductor 30 | 21 mH |
| capacitor 28 | 15 microfarads. |
| capacitor 16 | .047 microfarads |
| Switch 38 | IRF711 |
| flashtube 12 | DS1 |
| optocoupler 44 | 4N37 |

While the type 4N37 optoisolator has been described and specified in the foregoing chart, other optocouplers such as the Motorola Type MOC3012 optoisolator consisting of a gallium-arsenide infrared emitting diode optically coupled to a silicon bilateral switch designed for applications requiring isolated triac triggering, may be used instead. Also, switch 30 may be a transistor instead of the specified MOSFET.

It will have become apparent that the optocoupler used in the DC-to-DC converter circuit of the strobe alarm circuit limits the peak current flowing through the inductor to a value determined by the threshold voltage of the diode portion of the optocoupler, and, therefore, is substantially unaffected by variations in the supply voltage. The circuit has only three components in addition to the optocoupler, namely, two resistors and a Zener diode, and therefore is quite inexpensive and easily assembled into a small package.

While a particular embodiment of the invention has been shown, it will be understood that the invention is not limited thereto since modifications may now be made by those skilled in the art. It is, therefore, intended by the following claims to cover any such modifications which come within the spirit and scope of the invention.

I claim:

1. A strobe light circuit for flashing a flashtube at a desired rate, comprising:

a DC power source having positive and negative terminals for providing power at a predetermined voltage;

a flash unit connected across said source which includes said flashtube and is operable to fire said flashtube to generate a light output upon application across the unit of a voltage corresponding to the threshold firing voltage of said flashtube;

a capacitor connected in parallel with said flash unit so that said capacitor will cause firing of said flashtube upon attainment across said capacitor of a voltage corresponding to said threshold firing voltage;

circuit means including a first resistor and an inductor connected in series from the positive terminal of said source to a terminal of said capacitor;

switch means for connecting and disconnecting a terminal of said inductor to the negative terminal of said source to store energy in said inductor during periods of connection and causing energy to be coupled from said inductor to said capacitor during periods of disconnection of said switch means; and means for repetitively cycling said switch means between its open and closed state comprising said first resistor, and optocoupler means including a light-emitting diode connected in parallel with said first resistor for initiating the open period of said switch means in response to the current flowing through said first resistor attaining a value sufficient to turn on said light-emitting diode and for initiating the closed period of said switch means in response to the value of the current flowing through said resistor being insufficient to keep the light-emitting diode turned on.

2. A strobe light circuit as defined in claim 1, wherein said optocoupler means further includes a phototransistor optically coupled to said light-emitting diode and electrically connected to said switch means and operable to initiate the open period of said switch in response to light emitted by said light-emitting diode when turned on in response to the voltage drop developed across said first resistor upon the current flowing through said first resistor attaining said sufficient value.

3. A strobe light circuit as defined in claim 1, wherein said circuit means further includes a second resistor and a diode connected in series between the terminal of said inductor to which said switch means is connected and said capacitor, said diode being poled to only conduct current to said capacitor.

4. A circuit for controlling the transfer of predetermined increments of energy to a capacitor connected in parallel with a flash unit which includes a flashtube and is operable to fire said flashtube upon application across the unit of a voltage corresponding to the threshold firing voltage of said flashtube, said circuit comprising:

a DC power source having positive and negative terminals for providing power at a predetermined voltage;

circuit means including a first resistor and an inductor connected in series from the positive terminal of said source to said capacitor;

switch means connected from a terminal of said inductor to the negative terminal of said power source for connecting and disconnecting said inductor across said source to store energy in said inductor during periods of connection and for transferring energy from said inductor to said capacitor during periods of disconnection of said switch means; and means for repetitively cycling said switch means between open and closed states comprising said first resistor and an optocoupler comprising a light-emitting diode and a photosensitive switch optically coupled to said light-emitting diode and electrically connected to said switch means, said light-emitting diode being connected in parallel with said first resistor and operable to emit light in response to the current flowing through said first resistor and said inductor attaining a particular value sufficient to cause a voltage drop across said resistor in excess of a predetermined threshold voltage of said light-emitting diode and to cause said photosensitive switch to initiate the open period of said switch means, and operable to initiate the closed period of said switch in response to the current flowing through said resistor and inductor being insufficient to cause a voltage drop across said resistor sufficient to overcome the threshold voltage of the light-emitting diode.

5. A DC-to-DC converter for converting a voltage from a DC source having positive and negative terminals to predetermined increments of energy for application to a capacitor connected in parallel with a flashtube so that said capacitor will cause firing of said flashtube upon attainment across said capacitor of a voltage corresponding to the threshold firing voltage of the flashtube, said converter comprising:

first circuit means connected between the positive terminal of said DC source and said capacitor including a first resistor connected in series with an inductor for storing energy;

switch means connected from a terminal of said inductor to the negative terminal of said D.C. source for cyclically connecting and disconnecting said series-connected first resistor and inductor across said source and causing energy to be stored in said inductor during periods of connection and increments of energy to be transferred from said inductor to said capacitor during periods of disconnection; and means responsive to flow of charging current through said series-connected first resistor and inductor for repetitively cycling said switch means between open and closed states at a selected frequency comprising an optocoupler including a light-emitting diode connected across said first resistor and a phototransistor optically coupled to said light-emitting diode and electrically connected to said switch means, said light-emitting diode having a predetermined threshold voltage at which it is turned on upon attainment across said first resistor of said predetermined threshold voltage in response to the flow of charging current therethrough for rendering said phototransistor conducting and switching said switch means to its open state, causing transfer of energy from said inductor to said capacitor and the current flowing through said first resistor to be insufficient to keep said light-emitting diode turned on to thereby initiate repetition of the cycle.

* * * * *